(12) United States Patent
Cai et al.

(10) Patent No.: US 10,694,138 B2
(45) Date of Patent: *Jun. 23, 2020

(54) OLED DRIVE POWER DEVICE AND OLED TELEVISION

(71) Applicant: SHENZHEN CHUANGWEI-RGB ELECTRONIC CO., LTD, Shenzhen (CN)

(72) Inventors: Shengping Cai, Shenzhen (CN);
Qifeng Dai, Shenzhen (CN);
Zongwang Wei, Shenzhen (CN);
Jianhua Zhou, Shenzhen (CN)

(73) Assignee: SHENZHEN CHUANGWEI-RGB ELECTRONIC CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/097,402

(22) PCT Filed: Jan. 13, 2017

(86) PCT No.: PCT/CN2017/071023
§ 371 (c)(1),
(2) Date: Oct. 29, 2018

(87) PCT Pub. No.: WO2018/058861
PCT Pub. Date: Apr. 5, 2018

(65) Prior Publication Data
US 2019/0149761 A1    May 16, 2019

(30) Foreign Application Priority Data
Sep. 29, 2016  (CN) .......................... 2016 1 0863084

(51) Int. Cl.
*H04N 5/63*     (2006.01)
*G09G 3/3208*   (2016.01)

(52) U.S. Cl.
CPC ............. *H04N 5/63* (2013.01); *G09G 3/3208* (2013.01); *G09G 2330/026* (2013.01)

(58) Field of Classification Search
CPC ...................................................... H04N 5/63
See application file for complete search history.

(56) References Cited

U.S. PATENT DOCUMENTS 8,072,786 B2 * 12/2011 Lu ....................... H02M 1/4208
                                                         323/268
8,824,181 B2 *  9/2014 Choi .................... H02M 3/335
                                                          363/89

(Continued)

FOREIGN PATENT DOCUMENTS

CN    202008730 U    10/2011
CN    203243211 U    10/2013

(Continued)

OTHER PUBLICATIONS

The World Intellectual Property Organization (WIPO) International Search Report for PCT/CN2017/071023 dated Jun. 22, 2017 6 Pages.

*Primary Examiner* — Jefferey F Harold
*Assistant Examiner* — Humam M Satti
(74) *Attorney, Agent, or Firm* — Anova Law Group, PLLC

(57) ABSTRACT

An organic light-emitting diode (OLED) drive power device and OLED television, OLED drive power device comprising power board connected to motherboard and OLED screen logic board, power board having power supply circuit, first conversion module, second conversion module, changeover switch and power factor correction (PFC) circuit thereon; after powered, power supply circuit starts PFC circuit to output high-voltage direct current (HVDC) according to on-off signal output by motherboard, first conversion module converts HVDC into first voltage and second voltage to (Continued)

power motherboard, and first voltage is converted to power OLED screen logic board; after preset time period, HVDC is converted to power OLED screen logic board to light OLED screen. Redesigning architecture of power board eliminates need for standby circuit and streamlines circuits, meets power output stability and timing requirements of OLED, reduces power board size, reduces power cost and benefits OLED popularization.

18 Claims, 9 Drawing Sheets

(56) References Cited

U.S. PATENT DOCUMENTS

| | | | | |
|---|---|---|---|---|
| 9,414,449 | B2* | 8/2016 | Reed | H05B 45/37 |
| 9,844,107 | B2* | 12/2017 | Hu | H05B 33/0815 |
| 10,069,403 | B1* | 9/2018 | Lim | H02M 1/14 |
| 2006/0267565 | A1* | 11/2006 | Louvel | H04N 5/63 323/282 |
| 2006/0282693 | A1* | 12/2006 | Kim | H04N 5/63 713/300 |
| 2008/0165173 | A1* | 7/2008 | Choi | G09G 3/3208 345/211 |
| 2008/0297462 | A1* | 12/2008 | Hsiung | G09G 3/3406 345/102 |
| 2010/0007644 | A1* | 1/2010 | Kim | G09G 3/3406 345/211 |
| 2010/0213857 | A1* | 8/2010 | Fan | H05B 33/0815 315/186 |
| 2011/0012936 | A1* | 1/2011 | Kim | H05B 33/0809 345/690 |
| 2011/0043509 | A1* | 2/2011 | Lee | G09G 5/005 345/211 |
| 2011/0074763 | A1* | 3/2011 | Zhou | G06F 1/3203 345/212 |
| 2011/0096063 | A1* | 4/2011 | Kim | G06F 1/3203 345/212 |
| 2011/0188273 | A1 | 8/2011 | Pansier et al. | |
| 2011/0304272 | A1* | 12/2011 | Ng | H05B 41/285 315/127 |
| 2012/0146529 | A1* | 6/2012 | Campbell | H02M 1/10 315/210 |
| 2013/0057524 | A1* | 3/2013 | Bertin | H04N 5/44582 345/204 |
| 2013/0169517 | A1* | 7/2013 | Cho | G09G 3/3696 345/82 |
| 2013/0169695 | A1* | 7/2013 | Hyeon | G09G 3/3208 345/690 |
| 2013/0169697 | A1* | 7/2013 | Park | G09G 3/2003 345/690 |
| 2014/0285244 | A1* | 9/2014 | Zhou | G09G 5/006 327/143 |
| 2014/0368742 | A1* | 12/2014 | Joo | H02M 1/4208 348/730 |
| 2015/0091448 | A1* | 4/2015 | Kato | H02M 3/33507 315/158 |
| 2015/0091465 | A1* | 4/2015 | Kato | H02M 3/33507 315/205 |
| 2016/0379554 | A1* | 12/2016 | Zhang | G09G 3/3208 315/158 |
| 2017/0006688 | A1* | 1/2017 | Dai | H05B 33/0896 |
| 2017/0310224 | A1* | 10/2017 | Joo | G09G 3/3406 |
| 2017/0311400 | A1* | 10/2017 | Newman, Jr. | H05B 33/0815 |
| 2018/0309952 | A1* | 10/2018 | Yu | H04N 5/63 |
| 2018/0321734 | A1* | 11/2018 | Wu | H02M 3/3376 |
| 2019/0029086 | A1* | 1/2019 | Wang | G06F 1/263 |
| 2019/0149761 | A1* | 5/2019 | Cai | H04N 5/63 |

FOREIGN PATENT DOCUMENTS

| | | |
|---|---|---|
| CN | 103889118 A | 6/2014 |
| CN | 103997237 A | 8/2014 |
| KR | 101289829 B1 | 7/2013 |

* cited by examiner

OLED DRIVE POWER DEVICE AND OLED TELEVISION

CROSS-REFERENCES TO RELATED APPLICATIONS

This application is a national application of PCT Patent Application No. PCT/CN2017/071023, filed on Jan. 13, 2017, which claims priority to Chinese Patent Application No. 201610863084.0 filed on Sep. 29, 2016. The content of all of which is incorporate herein by reference.

FIELD OF THE INVENTION

The present invention relates to the field of technologies on power supplies, and more particularly, to an OLED drive power device and an OLED television.

BACKGROUND

An OLED (Organic Light Emitting Diode), due to no backlight required, neither a color filter nor a liquid crystal, and being capable of self-emitting, as well as being superior to a plurality of traditional LCDs and LEDs in a plurality of terms including an image quality, a response speed, a thickness and a viewing angle, thus has quickly become a hot spot for research by different major displayer manufacturers all the world. Following a gradual maturity of OLED technology, a TV using an OLED as a display solution is replacing the traditional LCDs and LEDs. Thus an OLED power supply having a stable feature, a high efficiency and a low cost is greatly needed. Also, comparing to a plurality of TVs using the traditional LCDs and LEDs, the TV using the OLED has not only a qualitative leap on the image quality, but also a plurality of features including a thin thickness, a flexibility and more. Combining the plurality of features, an appearance of the OLED in the future is becoming thinner, smaller, and more diverse. In order to meet a requirement for the appearance, reducing a size of a power board becomes greatly required.

An OLED TV in the present art, comparing to the plurality of TVs using the traditional LCDs and LEDs, has a higher requirement to a time sequence of a power supply, and a larger power, which leads to the size of the power board pretty large. The OLED power supply in the present art usually adopts a multiple-output with an independent control for each; architecture thereof on working is shown in FIG. 1, all main circuits are independent to each other, and are controlled by a plurality of signals from a motherboard. Wherein, a standby circuit outputs a power of 5V to supply the motherboard, an auxiliary winding outputs a VCC to power an IC of a motherboard controller and a plurality of other switching circuits. When a TV set is powered on, a power supply outputs a power of 5V to supply the motherboard, and after starting to work, the motherboard enables the main circuits output in a sequence according to a certain time sequence. When the TV set is standby, the motherboard receives a standby signal, turns off a plurality of outputs of the main circuits in a sequence, before entering a standby status. Such architecture has a plurality of circuits output independently to each other, with a definite relationship and a clear logic between each other, which is convenient for timing control. However, an overall architecture thereof is relatively complicated, resulting in the size of the power board being excessively large, which does not fit to a feature of the OLED of thin and light. How to avoid a contradiction between a novel and light design of the OLED TV and an excessive size of the power board is waiting for the researchers to solve.

Therefore, the current technology needs to be improved and developed.

BRIEF SUMMARY OF THE DISCLOSURE

According to the defects of the prior art described above, the purpose of the present invention is providing an OLED drive power device and an OLED television, by redesigning the architecture of the power board, the standby circuit is omit, the circuit is simplified, that not only satisfies a requirement of the OLED on stability and a time sequence of a power output, but also successfully reduces the size of the power board, having perfectly solved a contradiction between the OLED having light and thin features and the power board having an excessive size, as well as lowered a cost of the power supply, thus being conductive to a popularity of the OLED.

In order to achieve the above mentioned goals, the technical solution of the present invention to solve the technical problems is as follows:

An OLED drive power device, comprising a power board connecting to a motherboard and an OLED screen logic board, wherein the power board has arranged thereon a power supply circuit, a first conversion module, a second conversion module, a changeover switch and a PFC (power factor correction) circuit;

after powered on, the power supply circuit starts the PFC circuit according to an on-off signal output from the motherboard, the PFC circuit outputs a high-voltage direct current to the first conversion module and the second conversion module, and the first conversion module converts the high-voltage direct current into a first voltage and a second voltage before supplying power to the motherboard, and the changeover switch converts the first voltage into a first enable voltage to supply power to the OLED screen logic board according to a first enable signal output from the motherboard; after a preset period of time, the motherboard outputs a second enable signal, and the power supply circuit controls the second conversion module start according to the second enable signal, and covert the high-voltage direct current into a second enable voltage before powering the OLED screen logic board, and lighting up the OLED screen.

The OLED drive power device, wherein the power supply circuit comprises an on-off control circuit and an enable switching circuit, the on-off control circuit outputs a third voltage to start the PFC circuit according to the on-off signal output from the motherboard, and outputs a fourth voltage to supply power to the first conversion module, as well as outputs a fifth voltage according to the high-voltage direct current output from the PFC circuit; the enable switching circuit outputs the fifth voltage to supply power to the second conversion module according to the second enable signal output from the motherboard.

The OLED drive power device, wherein the first conversion module comprises a first LLC controller and a first transformer, the first LLC controller starts the first transformer according to the fourth voltage output from the on-off control circuit; the first transformer converts the high-voltage direct current output from the PFC circuit into the first voltage and the second voltage, before outputting to supply power to the motherboard.

The OLED drive power device, wherein the second conversion module comprises a second LLC controller and a second transformer, the second LLC controller starts the second transformer according to the fifth voltage output from the enable switching circuit; the second transformer converts the high-voltage direct current output from the PFC circuit into the second enable voltage and outputting to supply power to the OLED screen logic board.

The OLED drive power device, wherein the on-off control circuit comprises a first control sub-circuit and a second control sub-circuit, the first control sub-circuit outputs the third voltage to start the PFC circuit according to the on-off signal output from the motherboard, and outputs the fourth voltage to power the first conversion module; the second control sub-circuit outputs the fifth voltage according to the high-voltage direct current output from the PFC circuit after starting up.

The OLED drive power device, wherein the first conversion module further comprises a standby voltage-lowering circuit, applied to control a size of the first voltage and the second voltage output to the motherboard according to the on-off signal.

The OLED drive power device, wherein the standby voltage-lowering circuit comprises a first diode, a second diode, a third diode, a first resistor, a second resistor, a third resistor, a fourth resistor, a fifth resistor, a sixth resistor, a seventh resistor, an eighth resistor, a ninth resistor, a tenth resistor, an eleventh resistor, a first capacitor, a second capacitor, a third capacitor, a fourth capacitor, a first triode, a first optocoupler and a first shunt reference source;

an anode of the first diode connects to the motherboard, a cathode of the first diode connects to one end of the second resistor, one end of the first capacitor and a base electrode of the first triode through the first capacitor; another end of the second resistor gets grounded; another end of the first capacitor gets grounded; an emitting electrode of the first triode gets grounded, a collecting electrode of the first triode connects to one end of the seventh resistor, one end of the eighth resistor and one end of the third capacitor, through the third resistor; an anode of the second capacitor connects to one end of the fourth resistor, an anode of the second diode and a cathode of the third diode, a cathode of the second capacitor gets grounded; another end of the fourth resistor connects to a cathode of the second diode; an anode of the second diode connects to one end of the fourth capacitor and a cathode of the first shunt reference source; one end of the fifth resistor connects to a feedback pin of the first shunt reference source, another end of the fourth capacitor and one end of the third capacitor, another end of the fifth resistor gets grounded; one end of the sixth resistor connects to a feedback pin of the first shunt reference source, one end of the sixth resistor gets grounded; another end of the seventh resistor connects to the motherboard; another end of the eighth resistor connects to the OLED screen logic board, and a first pin of the first optocoupler through the eleventh resistor; one end of the ninth resistor connects to another end of the third capacitor, another end of the ninth resistor connects to another end of the tenth resistor, a cathode of the first shunt reference source and a second pin of the first optocoupler; a third pin of the first optocoupler gets grounded, a fourth pin of the first optocoupler connects to the motherboard; an anode of the first shunt reference source gets grounded.

The OLED drive power device, wherein the first control sub-circuit comprises a fourth diode, a fifth diode, a sixth diode, a twelfth resistor, a thirteenth resistor, a fourteenth resistor, a fifteenth resistor, a sixteenth resistor, a seventeenth resistor, an eighteenth resistor, a nineteenth resistor, a fifth capacitor, a sixth capacitor, a seventh capacitor, a second triode, a third triode, a fourth triode and a second optocoupler;

an anode of the fourth diode connects to the motherboard, a cathode of the fourth diode connects to one end of the thirteenth resistor, one end of the fifth capacitor and a base electrode of the second triode through the twelfth resistor; another end of the thirteenth resistor gets grounded; another end of the fifth capacitor gets grounded; an emitting electrode of the second triode gets grounded, a collecting electrode of the second triode connects to a second pin of the second optocoupler, a first pin of the second optocoupler and one end of the fifteenth resistor through the fourteenth resistor, another end of the fifteenth resistor connects to the enable switching circuit; a third pin of the second optocoupler connects to one end of the seventeenth resistor, a cathode of the fifth diode and a base electrode of the third diode through the sixteenth resistor; a fourth pin of the second optocoupler connects to a collecting electrode of the third triode and the first conversion module; another end of the seventeenth resistor gets grounded; an anode of the fifth resistor gets grounded; an emitting electrode of the third triode connects to a collecting electrode of the fourth triode, connects to one end of the nineteenth resistor and a cathode of the sixth diode through the eighteenth resistor, and gets grounded through the sixth resistor; another end of the nineteenth resistor gets grounded; an anode of the sixth diode gets grounded; a base electrode of the fourth triode connects to a cathode of the sixth diode, an emitting electrode of the fourth triode connects to the PFC circuit and the second control sub-circuit, and gets grounded through the seventh capacitor.

The OLED drive power device, wherein the second control sub-circuit comprises a twentieth resistor, a twenty-first resistor, a twenty-second resistor, a twenty-third resistor, a twenty-fourth resistor, a twenty-fifth resistor, a twenty-sixth resistor, a twenty-seventh resistor, a twenty-eighth resistor, a fifth triode, a seventh diode, an eighth diode, a ninth diode, an eighth capacitor, a ninth capacitor, a tenth capacitor, and a second shunt reference source;

an emitting electrode of the fifth triode connects to the first control sub-circuit, one end of the twenty-first resistor and a cathode of the second shunt reference source through the twentieth resistor, a base electrode of the fifth triode connects to another end of the twenty-first resistor, an emitting electrode of the fifth triode connects to an anode of the seventh diode, and connects to an anode of the eighth diode through the twenty-second resistor; a cathode of the seventh diode connects to the enable switching circuit; a cathode of the eighth diode connects to a cathode of the ninth diode, a feedback pin of the second shunt reference source, and gets grounded through the eighth capacitor; an anode of the second shunt reference source gets grounded; an anode of the ninth diode connects to one end of the twenty-fourth resistor, one end of the ninth capacitor, one end of the tenth capacitor and one end of the twenty-eighth resistor through the twenty-third resistor; another end of the twenty-fourth resistor gets grounded; another end of the ninth capacitor gets grounded; another end of the tenth capacitor gets ground; another end of the twenty-eighth resistor connects to the PFC circuit after connecting in series to the twenty-seventh resistor, the twenty-sixth resistor and the twenty-fifth resistor in sequence;

the enable switching circuit comprises a tenth diode, an eleventh diode, a twenty-ninth resistor, a thirtieth resistor, a thirty-first resistor, a thirty-second resistor, a thirty-third resistor, a eleventh capacitor, a sixth triode, a seventh triode and a third optocoupler;

an anode of the tenth diode connects to the motherboard, a cathode of the tenth diode connects to one end of the thirtieth resistor, one end of the eleventh resistor and a base electrode of the sixth triode through the twenty-ninth resistor; another end of the thirtieth resistor gets grounded; another end of the eleventh capacitor gets grounded; an emitting electrode of the sixth triode gets grounded, a collecting electrode of the sixth triode connects to a second pin of the third optocoupler; a first pin of the third optocoupler connects to the on-off control circuit through the thirty-first resistor, a third pin of the third optocoupler connects to one end of the thirty-third resistor, a cathode of the eleventh diode and a base electrode of the seventh triode through the thirty-second resistor, the fourth pin of the third optocoupler connects to the on-off control circuit and a collecting electrode of the seventh triode; an emitting electrode of the seventh triode connects to the second conversion module; another end of the thirty-third resistor gets grounded; an anode of the eleventh diode gets grounded.

An OLED television, comprises the OLED drive power device according to anyone described above.

Comparing to the present art, the OLED drive power device and the OLED television provided by the present invention, wherein the OLED drive power device comprises the power board connecting to the motherboard and the OLED screen logic board, wherein the power board has arranged the power supply circuit, the first conversion module, the second conversion module, the changeover switch and the PFC circuit; after powered on, the power supply circuit starts the PFC circuit according to the on-off signal output from the motherboard, the PFC outputs the high-voltage direct current to the first conversion module and the second conversion module, and the first conversion module convert the high-voltage direct current into the first voltage and the second voltage before supplying power to the motherboard, the changeover switch converts the first voltage into the first enable voltage and supplies power to the OLED screen logic board according to the first enable signal output from the motherboard; after a preset time, the motherboard outputs the second enable signal, the power supply circuit controls the second conversion module start according to the second enable signal, converting the high-voltage direct current into the second enable voltage to supply power to the OLED screen logic board, turning on the OLED screen. By redesigning the architecture of the power board, the standby circuit is omit, the circuit is simplified, that not only satisfies the requirement of the OLED on the stability and the time sequence of the power output, but also successfully reduces the size of the power board, having perfectly solved the contradiction between the OLED having light and thin features and the power board having an excessive size, as well as lowered the cost of the power supply, thus being conductive to the popularity of the OLED.

DETAILED DESCRIPTION OF EMBODIMENTS

Figure 1:
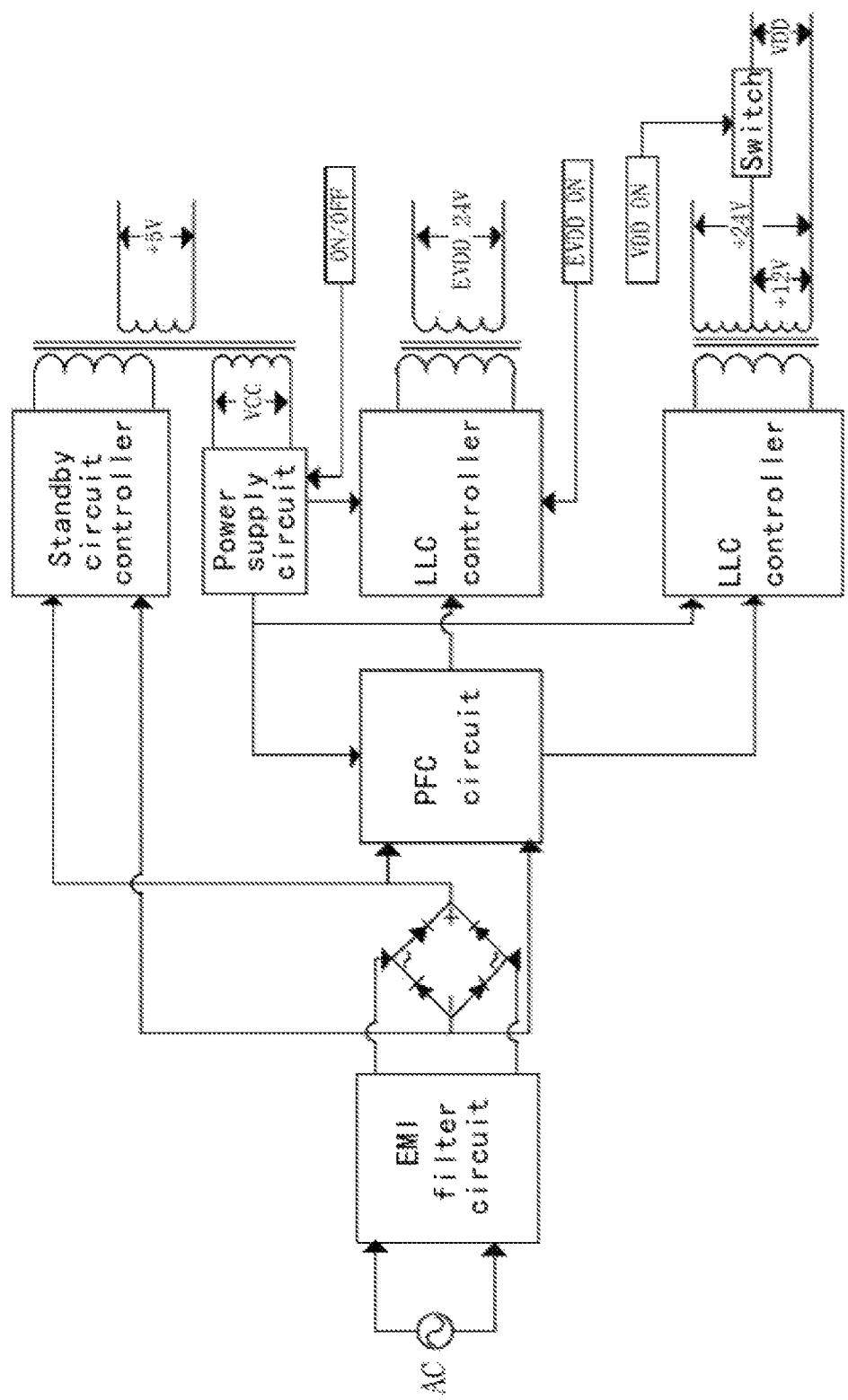
FIG. 1 illustrates a schematic diagram on the architecture of the OLED power supply in the present art.

According to the defects in the prior art that an OLED power architecture is complicated, a power board has an excessive large size, the purpose of the present invention is providing an OLED drive power device and an OLED television, by redesigning an architecture of the power board, a standby circuit is omit, a circuit is simplified, that not only satisfies the requirement of an OLED on a stability and a time sequence of a power output, but also successfully reduces a size of the power board, having perfectly solved a contradiction between an OLED having light and thin features and a power board having an excessive size.

In order to make the purpose, technical solution and the advantages of the present invention clearer and more explicit, further detailed descriptions of the present invention are stated here, referencing to the attached drawings and some embodiments of the present invention. It should be understood that the detailed embodiments of the invention described here are used to explain the present invention only, instead of limiting the present invention.

The OLED drive power device provided by the present invention is able to be applied as a power drive in a plurality of display related areas, including a TV, a monitor, an electric education, a back project, a plasma monitor and more, which adapts an organic light-emitting diode (OLED) as a display solution. Referencing to FIG. 2 and FIG. 3, the OLED drive power device provided by the present invention comprises a power board 10 connecting to a motherboard 20 and an OLED screen logic board 30, wherein the power board 10 has a power supply circuit 11, a first conversion module 12, a second conversion module 13, a changeover switch 14 and a PFC (power factor correction) circuit 15 arranged thereon, the power supply circuit 11 connects to the first conversion module 12, the second conversion module 13, the PFC circuit 15 and the motherboard 20, the PFC circuit 15 connects to the first conversion module 12 and the second conversion module 13, the first conversion module 12 further connects to the motherboard 20, the second conversion module 13 further connects to the OLED screen logic board 30, the changeover switch 14 connects to the motherboard 20 and the OLED screen logic board 30. After powered on, the power supply circuit 11 starts the PFC circuit 15 according to an on-off signal ON/OFF output from the motherboard 20, the PFC circuit 15 outputs a high-voltage direct current HV_DC to the first conversion module 12 and the second conversion module 13, and the first conversion module 12 converts the high-voltage direct current HV_DC into a first voltage (+12V in the present embodiment) and a second voltage (+24V in the present embodiment) before supplying power to the motherboard 20, and the changeover switch 14 converts the first voltage into a first enable voltage (VDD_12V in the present embodiment) to supply power to the OLED screen logic board 30 according to a first enable signal VDD_ON output from the motherboard 20; after a preset period of time, the motherboard 20 outputs a second enable signal EVDD_ON, and the power supply circuit 11 controls the second conversion module 13 start according to the second enable signal EVDD_ON, and convert the high-voltage direct current HV_DC into a second enable voltage (EVDD_24V in the present embodiment) before supplying power to the OLED screen logic board 30, before lighting up the OLED screen. The present invention creatively omits the standby circuit in a traditional OLED power supply, while adopting two circuits output independently at a same time, facilitating a timing control, which not only satisfies a requirement of stability and a time sequence, but also successfully reduces a size of the power board 10, and lowers a cost of the power supply.

Wherein, the power supply circuit 11 comprises an on-off control circuit (not shown in the FIGs) and an enable switching circuit (not shown in the FIGs), the on-off control circuit connects to the motherboard 20, the PFC circuit 15, the first conversion module 12 and the enable switching circuit, the enable switching circuit connects to the motherboard 20 and the second conversion module 13, the on-off control circuit outputs a third voltage PFC_VCC to start the PFC circuit 15 according to the on-off signal ON/OFF output from the motherboard 20, and outputs a fourth voltage VCC_VDD to supply power to the first conversion module 12, as well as outputs a fifth voltage PWM_VCC according to the high-voltage direct current HV_DC output from the PFC circuit 15; the enable switching circuit outputs the fifth voltage PWM_VCC to supply power to the second conversion module 13 according to the second enable signal EVDD_ON output from the motherboard 20.

Specifically, the on-off control circuit comprises a first control sub-circuit 1101 and a second control sub-circuit 1102, the first control sub-circuit 1101 connects to the motherboard 20, the PFC circuit 15, the first conversion module 12 and the second control sub-circuit 1102, the second control sub-circuit 1102 connects to the PFC circuit 15 and the enable switching circuit, the first control sub-circuit 1101 outputs the third voltage PFC_VCC to start the PFC circuit 15 according to the on-off signal ON/OFF output from the motherboard 20, and outputs the fourth voltage VCC_VDD to supply power to the first conversion module 12; the second control sub-circuit 1102 outputs the fifth voltage PWM_VCC according to the high-voltage direct current HV_DC output from the PFC after starting up.

Figure 4:
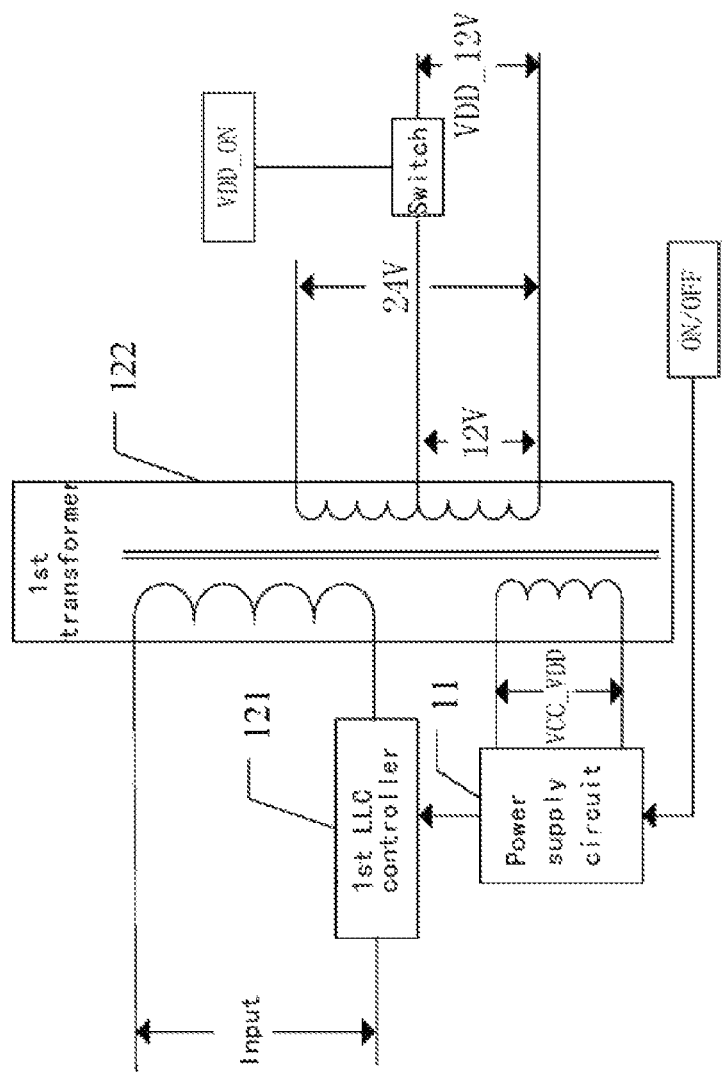
FIG. 4 illustrates a block diagram on a first conversion module and a power supply circuit thereof in the OLED drive power device provided by the present invention.
Figure 5:
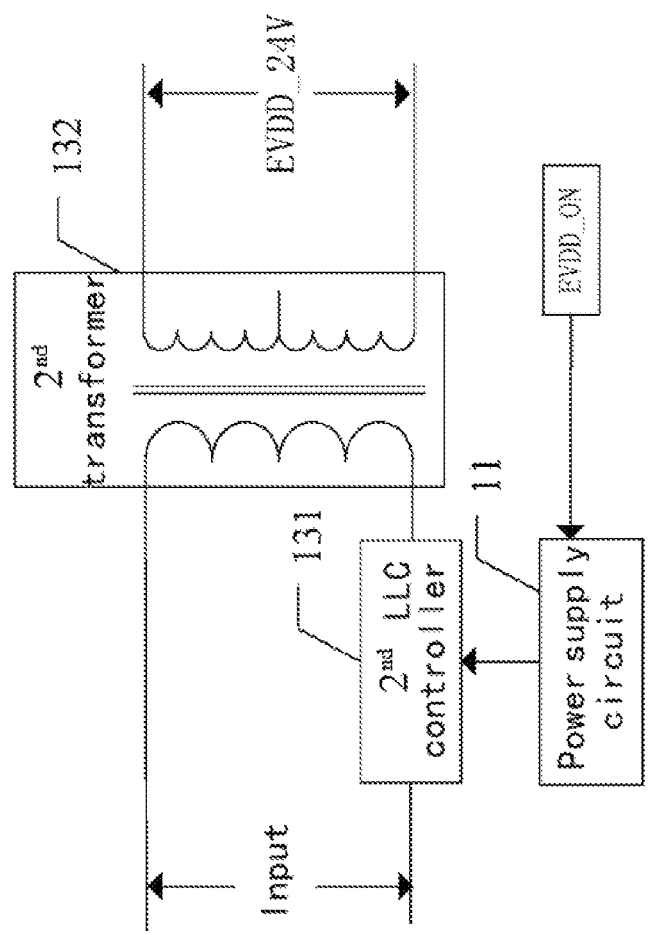
FIG. 5 illustrates a block diagram on a second conversion module and a power supply circuit thereof in the OLED drive power device provided by the present invention.

Referencing to FIG. 4 and FIG. 5 together, the OLED drive power device provided by the present invention, wherein the first conversion module 12 comprises a first LLC controller 121 and a first transformer 122, the first transformer 122 connects to the first LLC controller 121 and the motherboard 20, the first LLC controller 121 connects to the power supply circuit 11, the first LLC controller 121 starts the first transformer 122 according to the fourth voltage VCC_VDD output from the on-off control circuit; the first transformer 122 converts the high-voltage direct current HD_VC output from the PFC circuit 15 into the first voltage (+12V) and the second voltage (+24V), before outputting to supply power to the motherboard 20. That is, the main circuit has arranged an auxiliary winding arranged, outputting the VCC_VDD, while supplying power to a control IC hereof and the first LLC controller 121, in addition, the power supply circuit 11 converts the first voltage (+12V) into the first enable voltage (VDD_12V) when the first enable signal VDD_ON goes up, and outputs a voltage of 12V to supply power to the OLED screen logic board 30.

Since the OLED screen logic board 30 needs two routes of power supply before working, a 12V (VDD_12V) and a 24V (EVDD_24V), the second conversion module 13 in the OLED drive power device provided in the present invention comprises a second LLC controller 131 and a second transformer 132, the second transformer 132 connects to the second LLC controller 131 and the motherboard 20, the second LLC controller 131 connects to the power supply circuit 11, the changeover switch 14 converts the first voltage into the first enable voltage (VDD_12V) and supplies power to the OLED screen logic board 30 according to the first enable signal VDD_ON output from the motherboard 20; after a preset time, the power supply circuit 11 is powered on (ON/OFF goes high), that raises the second enable signal EVDD_ON, the second LLC controller 131 starts the second transformer 132 according to the fifth voltage PWM_VCC output from the enable switching circuit; the second transformer 132 converts the high-voltage direct current HV_DC output from the PFC circuit 15 into the second enable voltage (EVDD_24V), and outputs a 24V voltage to supply power to the OLED screen logic board 30, before lighting up the OLED screen. Through an independent output from each of the two routes of the main circuits, together with the switch circuit, it has made the power supply reach a requirement on timing, and avoided an interference between the two routes of voltages, ensuring a systematic working stability.

Further, since the motherboard 20 in the present invention is directly powered by the 12V, during the standby status, the main circuit is required to keep working, while there was only a 5V output in the standby status originally. Under a same load, the higher a voltage is, the greater a loss is, thus, in order to solve a problem of a great power consumption of a standby status, the first conversion module 12 further comprises a standby voltage lowering circuit, applied to control a size of the first voltage and the second voltage output to the motherboard 20 according to the on-off signal, when the on-off signal ON/OFF is high (that is a turning-on signal), the standby voltage lowering circuit controls the first voltage and the second voltage output 12V and 24V normally, and when the on-off signal ON/OFF is low (that is a turning-off signal), the standby voltage lowering circuit controls the first voltage and the second voltage decrease and output 11V and 22V, so as to lower the standby power consumption. At a same time, the present invention adopts a control IC having extremely low standby power consumption to further avoid the problem of a great power consumption, which owns an auto standby function, by a plurality of corresponding settings, it is possible to make the circuit enter a Burst mode during a standby status, and reach a goal of lowering the standby power consumption.

Figure 6:
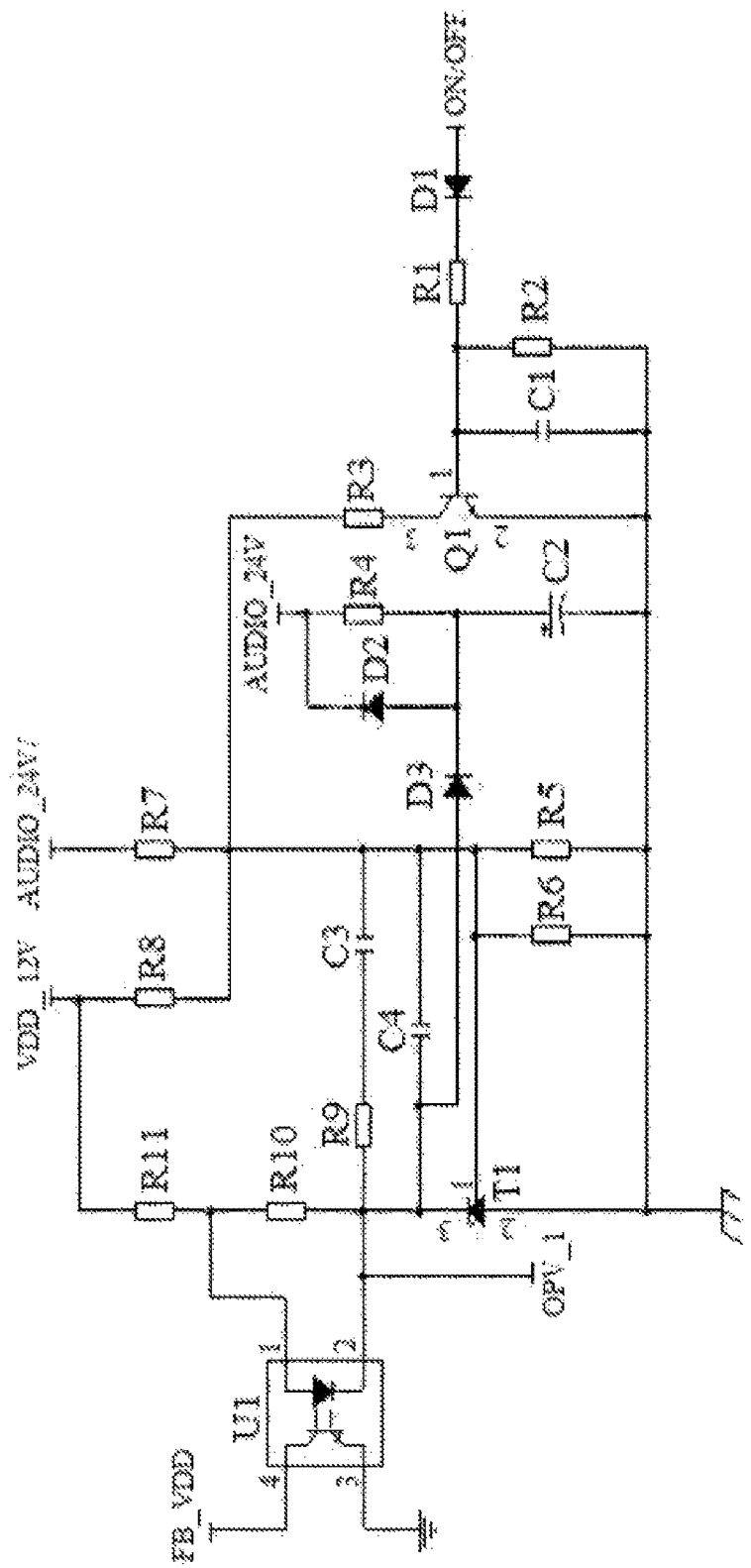
FIG. 6 illustrates a circuit diagram on the standby voltage lowering circuit in the OLED drive power device provided by the present invention.

Specifically, as shown in FIG. 6, the standby voltage lowering circuit comprises a first diode D1, a second diode D2, a third diode D3, a first resistor R1, a second resistor R2, a third resistor R3, a fourth resistor R4, a fifth resistor R5, a sixth resistor R6, a seventh resistor R7, an eighth resistor R8, a ninth resistor R9, a tenth resistor R10, an eleventh resistor R11, a first capacitor C1, a second capacitor C2, a third capacitor C3, a fourth capacitor C4, a first triode Q1, a first optocoupler U1 and a first shunt reference source T1.

An anode of the first diode D1 connects to the motherboard 20 (applied to outputting the on-off signal ON/OFF), a cathode of the first diode D1 connects to one end of the second resistor R2, one end of the first capacitor C1 and a base electrode of the first triode Q1 through the first capacitor C1; another end of the second resistor R2 gets grounded; another end of the first capacitor C1 gets grounded; an emitting electrode of the first triode Q1 gets grounded, a collecting electrode of the first triode Q1 connects to one end of the seventh resistor R7, one end of the eighth resistor R8 and one end of the third capacitor C3, through the third resistor R3; an anode of the second capacitor C2 connects to one end of the fourth resistor R4, an anode of the second diode D2 and a cathode of the third diode D3, a cathode of the second capacitor C2 gets grounded; another end of the fourth resistor R4 connects to a cathode of the second diode D2; an anode of the second diode D2 connects to one end of the fourth capacitor C4 and a cathode of the first shunt reference source T1; one end of the fifth resistor R5 connects to a feedback pin of the first shunt reference source T1, another end of the fourth capacitor C4 and one end of the third capacitor C3, another end of the fifth resistor R5 gets grounded; one end of the sixth resistor R6 connects to the feedback pin of the first shunt reference source T1, another end of the sixth resistor R6 gets grounded; another end of the seventh resistor R7 connects to the motherboard 20; another end of the eighth resistor R8 connects to the OLED screen logic board 30, and a first pin of the first optocoupler U1 through the eleventh resistor R11; one end of the ninth resistor R9 connects to another end of the third capacitor C3, another end of the ninth resistor R9 connects to another end of the tenth resistor R10, a cathode of the first shunt reference source T1 and a second pin of the first optocoupler U1; a third pin of the first optocoupler U1 gets grounded, a fourth pin of the first optocoupler U1 connects to the motherboard 20; an anode of the first shunt reference source T1 gets grounded. The first triode Q1 is a NPN triode, a model of the first optocoupler U1 is PC817, a model of the first shunt reference source T1 is TL431.

When it is powered on, the ON/OFF signal goes high, the first triode Q1 is turned on, the feedback pin of the first shunt reference source T1 has a resistance value of three resistors connected in parallel, that is the third resistor R3, the fifth resistor R5 and the sixth resistor R6, a normal voltage is output; when it is in a standby status, the ON/OFF signal goes low, the first triode Q1 is turned off, the feedback pin of the first shunt reference source T1 has a resistance value of the fifth resistor R5 and the sixth resistor R6 connected in parallel, the resistance decreases, which lowers the output voltage to around 10.5V, thus lowering the standby power consumption, making a system work normally.

Figure 7:
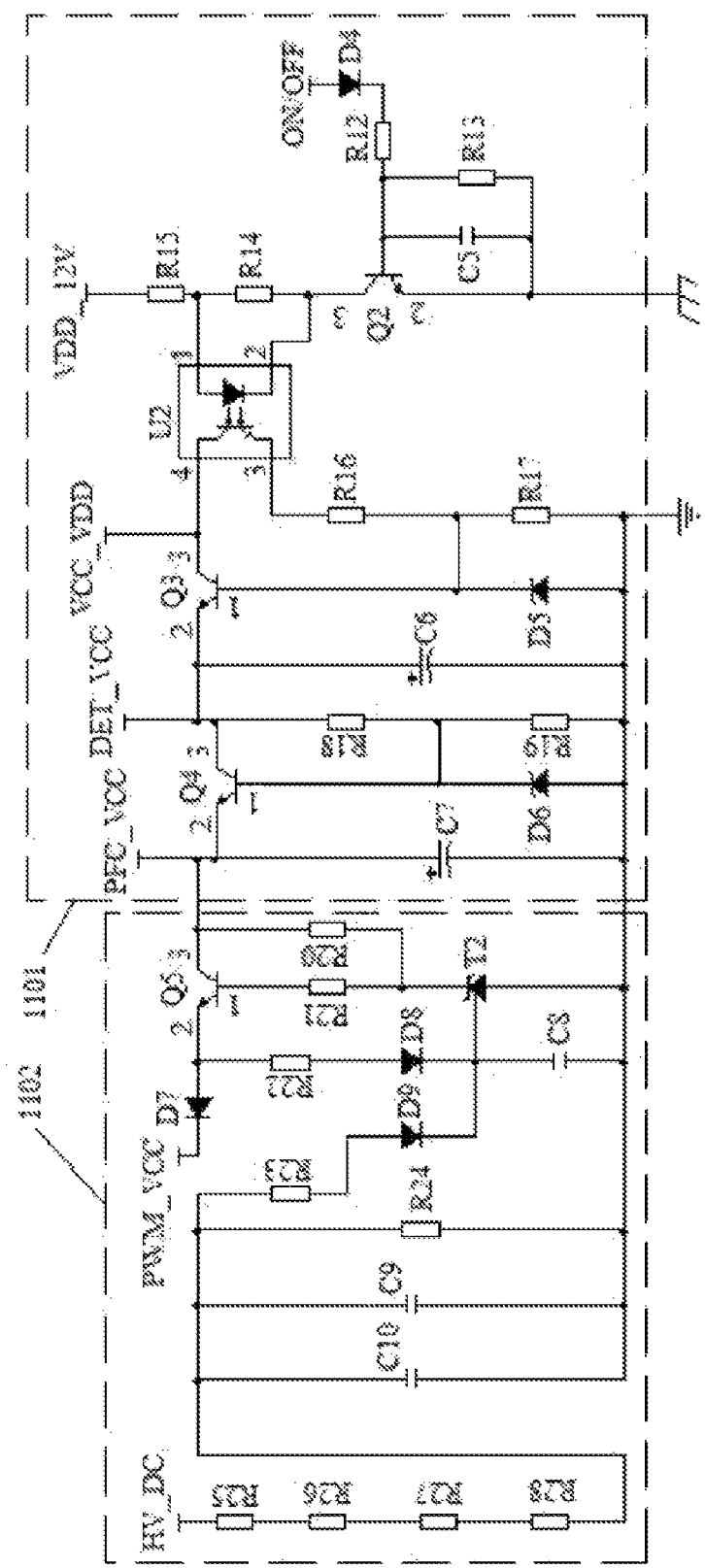
FIG. 7 illustrates a circuit diagram on the on-off control circuit in the OLED drive power device provided by the present invention.

Further, referencing to FIG. 7 together, the first control sub-circuit 1101 comprises a fourth diode D4, a fifth diode D5, a sixth diode D6, a twelfth resistor R12, a thirteenth resistor R13, a fourteenth resistor R14, a fifteenth resistor R15, a sixteenth resistor R16, a seventeenth resistor R17, an eighteenth resistor R18, a nineteenth resistor R19, a fifth capacitor C5, a sixth capacitor C6, a seventh capacitor C7, a second triode Q2, a third triode Q3, a fourth triode Q4 and a second optocoupler U2.

An anode of the fourth diode D4 connects to the motherboard 20 (applied to inputting the on-off signal ON/OFF), a cathode of the fourth diode D4 connects to one end of the thirteenth resistor R13, one end of the fifth capacitor C5 and a base electrode of the second triode Q2 through the twelfth resistor R12; another end of the thirteenth resistor R13 gets grounded; another end of the fifth capacitor C5 gets grounded; an emitting electrode of the second triode Q2 gets grounded, a collecting electrode of the second triode Q2 connects to a second pin of the second optocoupler U2, a first pin of the second optocoupler U2 and one end of the fifteenth resistor R15 through the fourteenth resistor R14, another end of the fifteenth resistor R15 connects to the enable switching circuit; a third pin of the second optocoupler U2 connects to one end of the seventeenth resistor R17, a cathode of the fifth diode D5 and a base electrode of the third diode D3 through the sixteenth resistor R16; a fourth pin of the second optocoupler U2 connects to a collecting electrode of the third triode Q3 and the first conversion module 12 (applied to outputting a fourth voltage VCC_VDD); another end of the seventeenth resistor R17 gets grounded; an anode of the fifth resistor R5 gets grounded; an emitting electrode of the third triode Q3 connects to a collecting electrode of the fourth triode Q4, connects to one end of the nineteenth resistor R19 and a cathode of the sixth diode D6 through the eighteenth resistor R18, and gets grounded through the sixth resistor R6; another end of the nineteenth resistor R19 gets grounded; an anode of the sixth diode D6 gets grounded; a base electrode of the fourth triode Q4 connects to a cathode of the sixth diode D6, an emitting electrode of the fourth triode Q4 connects to the PFC circuit 15 (applied to outputting a first voltage PFC_VCC) and the second control sub-circuit 1102, and gets grounded through the seventh capacitor C7.

In the present embodiment, the second triode Q2, the third triode Q3, the fourth triode Q4, are NPN triodes, the fifth diode D5 and the sixth diode D6 are Zener diodes, being able to protect the third triode Q3 and the fourth triode Q4, a model of the second optocoupler U2 is PC817. The fourth diode D4, the twelfth resistor R12, the thirteenth resistor R13 and the third capacitor C3 comprise a filter voltage divider circuit, a voltage division on the twelfth resistor R12 and the thirteenth resistor R13 is a conduction voltage at the base electrode of the second triode Q2, determining a conduction status of the second triode Q2, the fifth capacitor C5 smoothes and filters the conduction voltage, when an on-off signal is received by a remote control, the motherboard 20 outputs a power on signal, and the ON/OFF signal goes up, now both the first voltage and the second voltage rise to a normal voltage, that is, 12V and 24V, the motherboard 20 starts to work normally, the second diode D2 gets conducted, and controls a supply voltage of a PFC chip ICE3PCS01 through the second optocoupler U2, when the fourth triode Q4 is conducted, the PFC chip starts to work, the PFC circuit 15 will output a stable 380V-400V high voltage direct current HV_DC after raising the voltage, and feedback to the second control sub-circuit 1102.

Continuing to reference to FIG. 7, the second control sub-circuit 1102 comprises a twentieth resistor R20, a twenty-first resistor R21, a twenty-second resistor R22, a twenty-third resistor R23, a twenty-fourth resistor R24, a twenty-fifth resistor R25, a twenty-sixth resistor R26, a twenty-seventh resistor R27, a twenty-eighth resistor R28, a fifth triode Q5, a seventh diode D7, an eighth diode D8, a ninth diode D9, an eighth capacitor C8, a ninth capacitor C9, a tenth capacitor C10, and a second shunt reference source T2;

an emitting electrode of the fifth triode Q5 connects to the first control sub-circuit 1101, one end of the twenty-first resistor R21 and a cathode of the second shunt reference source T2 through the twentieth resistor R20, a base electrode of the fifth triode Q5 connects to another end of the twenty-first resistor R21, an emitting electrode of the fifth triode Q5 connects to an anode of the seventh diode D7, and connects to an anode of the eighth diode D8 through the twenty-second resistor; a cathode of the seventh diode D7 connects to the enable switching circuit (to output the fifth voltage PWM_VCC); a cathode of the eighth diode D8 connects to a cathode of the ninth diode D9, a feedback pin of the second shunt reference source T2, and gets grounded through the eighth capacitor C8; an anode of the second shunt reference source T2 gets grounded; an anode of the ninth diode D9 connects to one end of the twenty-fourth resistor R24, one end of the ninth capacitor C9, one end of the tenth capacitor C10 and one end of the twenty-eighth resistor R28 through the twenty-third resistor R23; another end of the twenty-fourth resistor R24 gets grounded; another end of the ninth capacitor C9 gets grounded; another end of the tenth capacitor C10 gets ground; another end of the twenty-eighth resistor R28 connects to the PFC circuit 15 after connecting in series to the twenty-seventh resistor R27, the twenty-sixth resistor R26, the twenty-fifth resistor R25 in sequence (to input the high voltage direct current HV_DC).

In the present embodiment, the fifth triode Q5 is a PNP triode, the twenty-fifth resistor R25, the twenty-sixth resistor R26, the twenty-seventh resistor R27 and the twenty-eighth resistor R28 compose a voltage divider resistors group, the twentieth resistor R20 and the twenty-first resistor R21 are mainly applied to adjusting the on-off status of the fifth triode Q5, the seventh diode D7 is mainly applied to blocking a filter, to stabilize an output of the fifth voltage, the capacitors are mainly applied to filtering and smoothing a waveform. After the PFC circuit 15 outputs a stable 380V-400V high voltage direct current HV_DC after raising the voltage, and feedbacks to the second control sub-circuit 1102, the high voltage direct current HV_DC is then divided by the voltage divide resistor into a voltage value of higher than 2.5V to the feedback pin of the second shunt reference source T2, the second shunt reference source T2 getting conducted makes a base electrode of the fifth triode Q5 be a low voltage, and the fifth triode Q5 is conducted, now the fifth voltage PWM_VCC has a voltage, followed by the enable switching circuit outputs the fifth voltage PWM_VCC to supply power to the second conversion module 13, when the enable switching circuit receives the second enable signal EVDD_ON being high.

Figure 8:
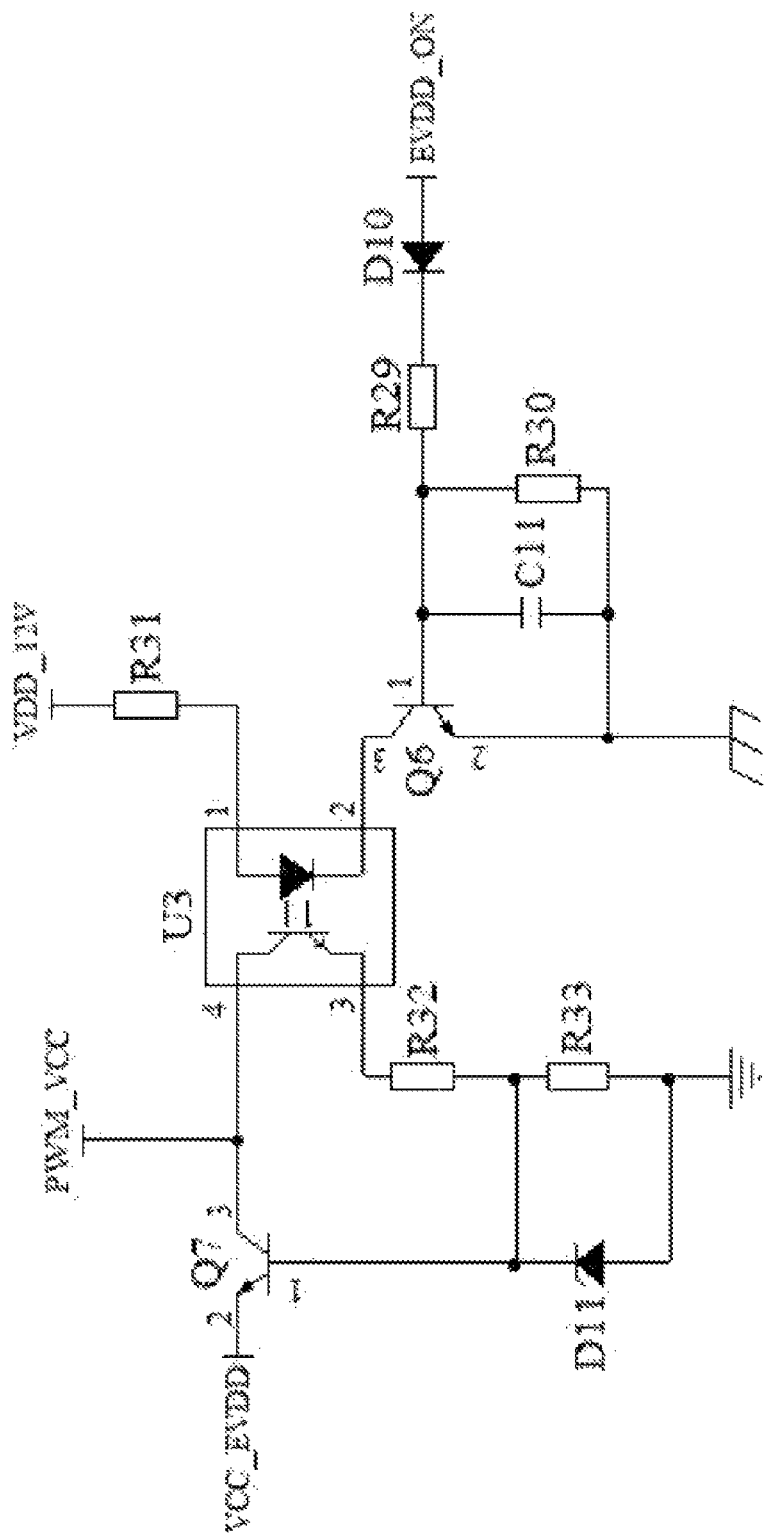
FIG. 8 illustrates a circuit diagram on the enable switching circuit in the OLED drive power device provided by the present invention.

Specifically, referencing to FIG. 8 together, the enable switching circuit comprises a tenth diode D10, an eleventh diode D11, a twenty-ninth resistor R29, a thirtieth resistor R30, a thirty-first resistor R31, a thirty-second resistor R32, a thirty-third resistor R33, a eleventh capacitor C11, a sixth triode Q6, a seventh triode Q7 and a third optocoupler U3.

An anode of the tenth diode D10 connects to the motherboard 20 (applied to inputting the second enable signal EVDD_ON), a cathode of the tenth diode D10 connects to one end of the thirtieth resistor R30, one end of the eleventh capacitor C11 and a base electrode of the sixth triode Q6 through the twenty-ninth resistor R29; another end of the thirtieth resistor R30 gets grounded; another end of the eleventh capacitor C11 gets grounded; an emitting electrode of the sixth triode Q6 gets grounded, a collecting electrode of the sixth triode Q6 connects to a second pin of the third optocoupler U3; a first pin of the third optocoupler U3 connects to the on-off control circuit through the thirty-first resistor R31, a third pin of the third optocoupler U3 connects to one end of the thirty-third resistor R33, a cathode of the eleventh diode D11 and a base electrode of the seventh triode Q7 through the thirty-second resistor R32, the fourth pin of the third optocoupler U3 connects to the on-off control circuit and a collecting electrode of the seventh triode Q7; an emitting electrode of the seventh triode Q7 connects to the second conversion module 13; another end of the thirty-third resistor R33 gets grounded; an anode of the eleventh diode D11 gets grounded.

In the present embodiment, the sixth triode Q6 and the seventh triode Q7 are NPN triodes, the eleventh diode D11 is a Zener diode, being able to protect the seventh triode Q7. The thirty-second resistor R32 and the thirty-third resistor R33 are mainly applied to adjusting a conduction status of the seventh triode Q7, the tenth diode D10, the twenty-ninth resistor R29, the thirtieth resistor R30 and the eleventh capacitor C11 are mainly applied to filtering out an interference signal in the second enable signal EVDD_ON input, smoothing a waveform thereof. A model of the third optocoupler U3 is PC817, a model of the first shunt reference source T1 is TL431. When a second enable signal EVDD_ON output from the motherboard 20 is received high, the sixth triode Q6 is conducted, increasing a conduction of the third optocoupler U3, a voltage of the base electrode of the seventh triode Q7 goes up, now the seventh triode Q7 is saturated and conducted, the fifth voltage PWM_VCC is output from the seventh triode Q7 to supply power to the second conversion module 13, the second conversion module 13 further converts the high voltage direct current HV_DC into the second enable voltage and supply power to the OLED screen logic board 30, before lighting up the OLED screen.

Figure 2:
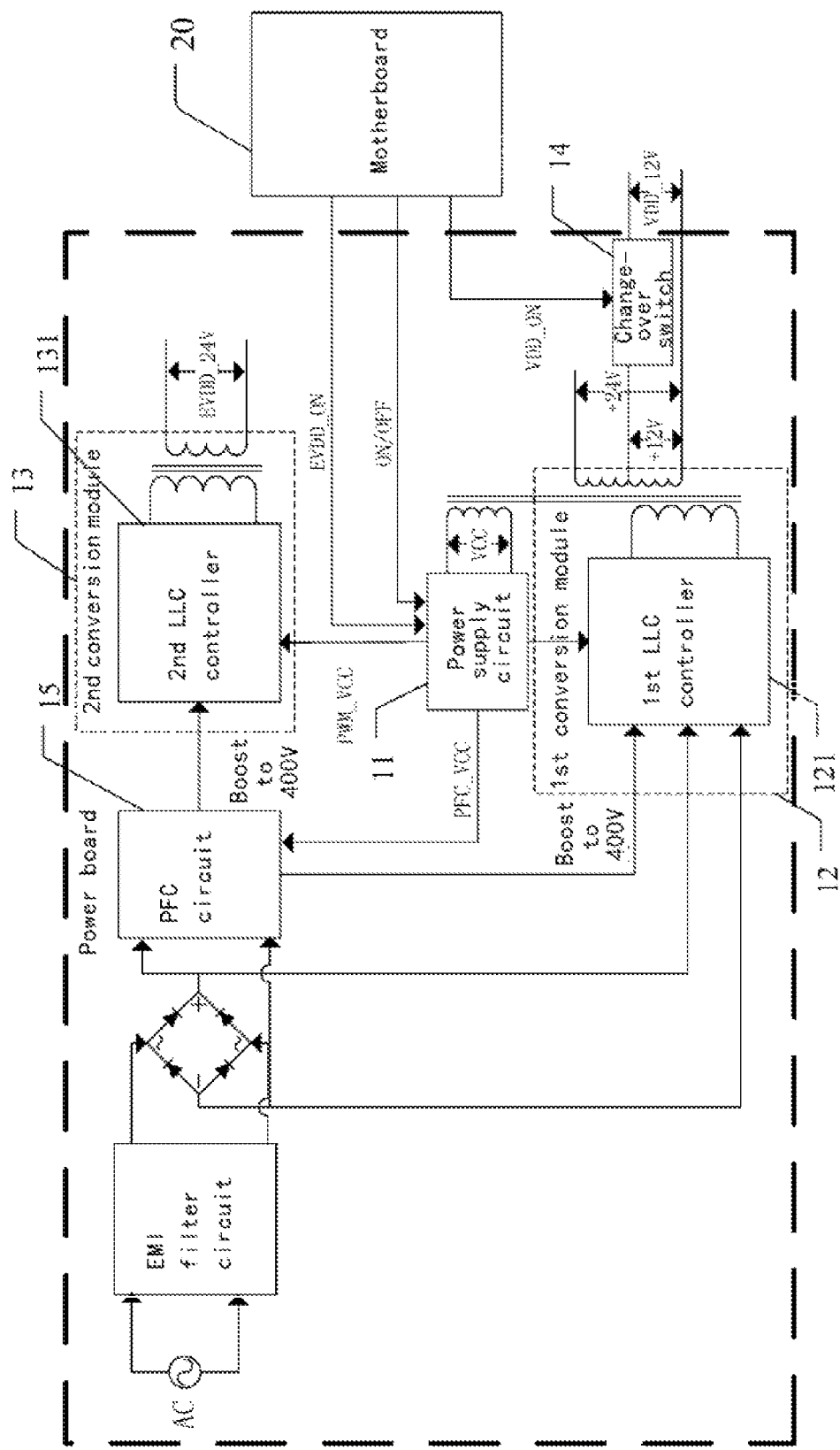
FIG. 2 illustrates a schematic diagram on the architecture of the OLED drive power device provided by the present invention.
Figure 3:
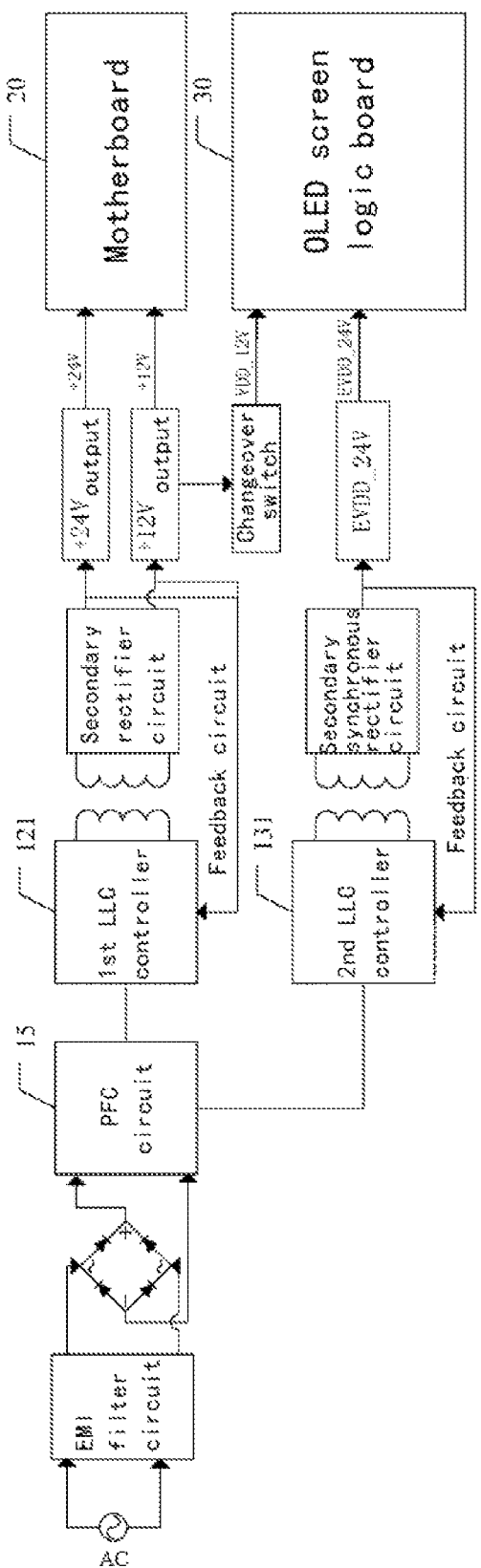
FIG. 3 illustrates a schematic diagram on a power supply circuit in the OLED drive power device provided by the present invention.
Figure 9:
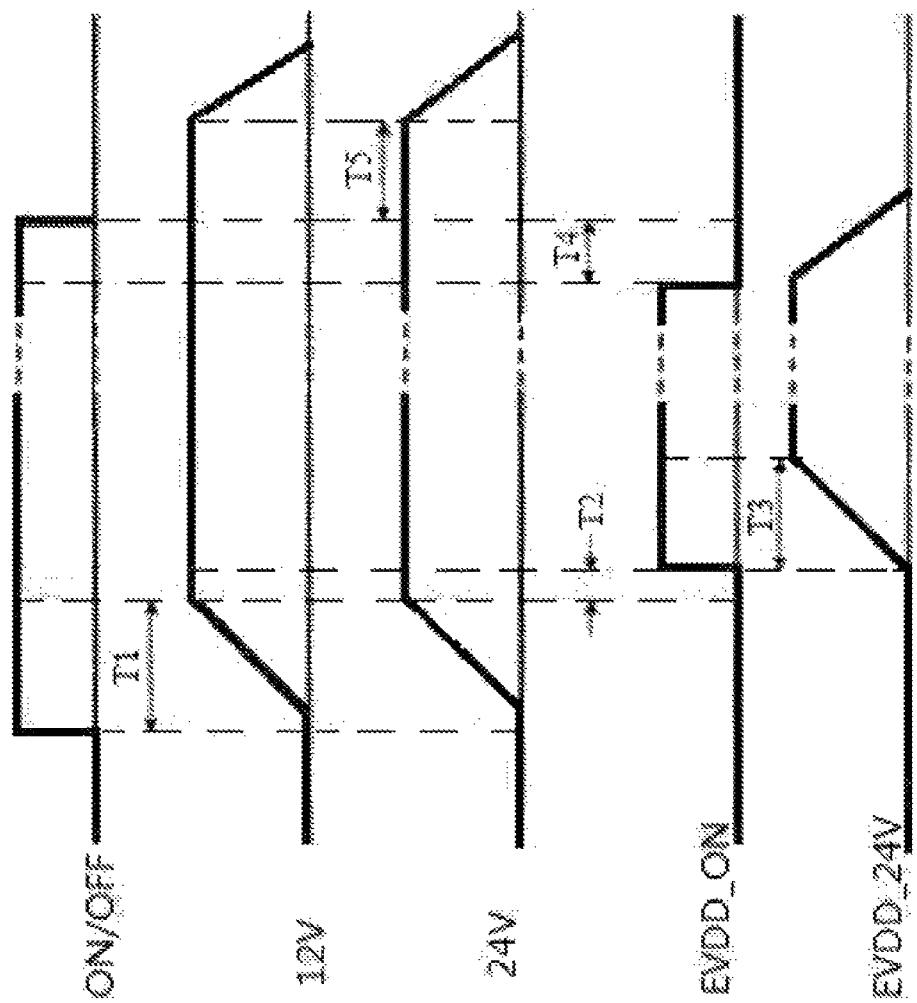
FIG. 9 illustrates an on-off timing diagram on the OLED drive power device provided by the present invention.

An on-off timing diagram on the OLED drive power device provided by the present invention is shown as FIG. 9, more detailed descriptions on a start-up process and a standby process are stated herein, referencing to the FIG. 2 to the FIG. 9.

When it is powered on, an electric cord is plugged in, the first conversion module 12 will have an output of around 11V and 22V independently, when a remoter receives an power signal, the motherboard 20 will give an ON/OFF signal of a high voltage, now the fourth triode Q4 gets conducted, the power supply circuit 11 starts to supply power to the PFC circuit 15, the PFC chip starts to work, raising a rectified voltage to around 400V; and when the ON/OFF signal is high, the standby voltage lowering circuit starts to be switched to a normal work mode, that is, the Q1 is conducted, after a period of around T1, the voltage output from the first conversion module 12 rises to the normal values of 12V and 24V from 11V and 22V, the motherboard 20 starts to work normally. In order to light up the screen, the motherboard 20 will give a VDD_ON signal to the changeover switch 14, and the changeover switch 14 is turned on, converting the 12V into VDD_12V, before giving the VDD_12V voltage to a T-CON (that is, the OLED screen logic board 30), while the T-CON of the OLED screen requires two routes of power supply of 12V (VDD_12V) and 24V (EVDD_24V) before starting to work, thus after a preset period (that is the T2 time), the motherboard 20 further gives out an EVDD_ON rising up signal, while the 400V high voltage direct current feedback by the PFC circuit 15 makes the fifth triode Q5 conduct after a voltage division, making the PWM_VCC have a voltage, now the power supply circuit 11 will output a PWM_VCC to supply power to the second conversion module 13, before the second conversion module 13 starting to work, and outputting the EVDD_24V to the T-CON, after a period of T3, the second enable voltage reaches to a stable output, the OLED screen logic board 30 starts to work, and the OLED screen is lit up.

When the motherboard 20 receives the standby signal, the motherboard 20 will first lower the EVDD_ON signal, and the power supply circuit 11 will no longer supply power to the second conversion module 13, the main circuit EVDD_24V will no longer output, after that, the VDD_ON signal of the motherboard 20 is also getting lower, and a switch on the 12V output from the auxiliary circuit converting to the VDD_12V is broken, no more VDD_12V being output, and finally after a T4 time, the motherboard 20 lowers the ON/OFF signal again, the PFC circuit 15 stops working, and further after a T5 time, the output voltage starts to decrease from 12V and 24V to around 11V and 22V for outputting, before entering the voltage lowering standby mode, wherein the T5 time is no less than 30 ms, ensuring turning on or off the OLED screen and the motherboard 20 will not happen simultaneously, to avoid a burred screen appearing.

The present invention further provides an OLED TV accordingly, comprising the OLED drive power device according to the descriptions above, due to a detailed description on the OLED drive power device has been stated in details above, and no more descriptions will be listed herein again.

All above, the OLED drive power device and the OLED television provided by the present invention, wherein the OLED drive power device comprises the power board connecting to the motherboard and the OLED screen logic board, wherein the power board has arranged the power supply circuit, the first conversion module, the second conversion module, the changeover switch and the PFC circuit; after powered on, the power supply circuit starts the PFC circuit according to the on-off signal output from the motherboard, the PFC outputs the high-voltage direct current to the first conversion module and the second conversion module, and the first conversion module converts the high-voltage direct current into the first voltage and the second voltage before supplying power to the motherboard, the changeover switch converts the first voltage into the first enable voltage and supplies power to the OLED screen logic board according to the first enable signal output from the motherboard; after a preset time, the motherboard outputs the second enable signal, the power supply circuit controls the second conversion module start according to the second enable signal, converting the high-voltage direct current into the second enable voltage and supplying power to the OLED screen logic board, lightening the OLED screen. By redesigning the architecture of the power board, the standby circuit is omit, the circuit is simplified, that not only satisfies the requirement of the OLED on the stability and the time sequence of the power output, but also successfully reduces the size of the power board, having perfectly solved the contradiction between the OLED having light and thin features and the power board having an excessive size, as well as lowered the cost of the power supply, thus being conductive to the popularity of the OLED.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. An OLED drive power device, comprising a power board connecting to a motherboard and an OLED screen logic board, wherein the power board has arranged thereon a power supply circuit, a first conversion module, a second conversion module, a changeover switch and a PFC circuit;
after powered on, the power supply circuit starts the PFC circuit according to an on-off signal output from the motherboard, the PFC circuit outputs a high-voltage direct current to the first conversion module and the second conversion module, and the first conversion module converts the high-voltage direct current into a first voltage and a second voltage to supply power to the motherboard, and the changeover switch converts the first voltage into a first enable voltage to supply power to the OLED screen logic board according to a first enable signal output from the motherboard; after a preset period of time, the motherboard outputs a second enable signal, and the power supply circuit controls the second conversion module start according to the second enable signal, and convert the high-voltage direct current into a second enable voltage to supply power to the OLED screen logic board, and lighting up the OLED screen.

2. The OLED drive power device according to claim 1, wherein the power supply circuit comprises an on-off control circuit and an enable switching circuit, the on-off control circuit outputs a third voltage to start the PFC circuit according to the on-off signal output from the motherboard, and outputs a fourth voltage to supply power to the first conversion module, as well as outputs a fifth voltage according to the high-voltage direct current output from the PFC circuit; the enable switching circuit outputs the fifth voltage to supply power to the second conversion module according to the second enable signal output from the motherboard.

3. The OLED drive power device according to claim 2, wherein the first conversion module comprises a first LLC controller and a first transformer, the first LLC controller starts the first transformer according to the fourth voltage output from the on-off control circuit; the first transformer converts the high-voltage direct current output from the PFC circuit into the first voltage and the second voltage, and outputs to supply power to the motherboard.

4. The OLED drive power device according to claim 2, wherein the second conversion module comprises a second LLC controller and a second transformer, the second LLC controller starts the second transformer according to the fifth voltage output from the enable switching circuit; the second transformer converts the high-voltage direct current output from the PFC circuit into the second enable voltage to supply power to the OLED screen logic board.

5. The OLED drive power device according to claim 2, wherein the on-off control circuit comprises a first control sub-circuit and a second control sub-circuit, the first control sub-circuit outputs the third voltage to start the PFC circuit according to the on-off signal output from the motherboard, and outputs the fourth voltage to power the first conversion module; the second control sub-circuit outputs the fifth voltage according to the high-voltage direct current output from the PFC circuit after starting up.

6. The OLED drive power device according to claim 3, wherein the first conversion module further comprises a standby voltage lowering circuit, applied to control a size of the first voltage and the second voltage output to the motherboard according to the on-off signal.

7. The OLED drive power device according to claim 6, wherein the standby voltage lowering circuit comprises a first diode, a second diode, a third diode, a first resistor, a second resistor, a third resistor, a fourth resistor, a fifth resistor, a sixth resistor, a seventh resistor, an eighth resistor, a ninth resistor, a tenth resistor, an eleventh resistor, a first capacitor, a second capacitor, a third capacitor, a fourth capacitor, a first triode, a first optocoupler and a first shunt reference source; an anode of the first diode connects to the motherboard, a cathode of the first diode connects to one end of the second resistor, one end of the first capacitor and a base electrode of the first triode through the first capacitor; another end of the second resistor gets grounded; another end of the first capacitor gets grounded; an emitting electrode of the first triode gets grounded, a collecting electrode of the first triode connects to one end of the seventh resistor, one end of the eighth resistor and one end of the third capacitor, through the third resistor; an anode of the second capacitor connects to one end of the fourth resistor, an anode of the second diode and a cathode of the third diode, a cathode of the second capacitor gets grounded; another end of the fourth resistor connects to a cathode of the second diode; the anode of the second diode connects to one end of the fourth capacitor and a cathode of the first shunt reference source; one end of the fifth resistor connects to a feedback pin of the first shunt reference source, another end of the fourth capacitor and one end of the third capacitor, another end of the fifth resistor gets grounded; one end of the sixth resistor connects to the feedback pin of the first shunt reference source, one end of the sixth resistor gets grounded; another end of the seventh resistor connects to the motherboard; another end of the eighth resistor connects to the OLED screen logic board, and a first pin of the first optocoupler through the eleventh resistor; one end of the ninth resistor connects to another end of the third capacitor, another end of the ninth resistor connects to another end of the tenth resistor, a cathode of the first shunt reference source and a second pin of the first optocoupler; a third pin of the first optocoupler gets grounded, a fourth pin of the first optocoupler connects to the motherboard; an anode of the first shunt reference source gets grounded.

8. The OLED drive power device according to claim 5, wherein the first control sub-circuit comprises a fourth diode, a fifth diode, a sixth diode, a twelfth resistor, a thirteenth resistor, a fourteenth resistor, a fifteenth resistor, a sixteenth resistor, a seventeenth resistor, an eighteenth resistor, a nineteenth resistor, a fifth capacitor, a sixth capacitor, a seventh capacitor, a second triode, a third triode, a fourth triode and a second optocoupler;

an anode of the fourth diode connects to the motherboard, a cathode of the fourth diode connects to one end of the thirteenth resistor, one end of the fifth capacitor and a base electrode of the second triode through the twelfth resistor; another end of the thirteenth resistor gets grounded; another end of the fifth capacitor gets grounded; an emitting electrode of the second triode gets grounded, a collecting electrode of the second triode connects to a second pin of the second optocoupler, a first pin of the second optocoupler and one end of the fifteenth resistor through the fourteenth resistor, another end of the fifteenth resistor connects to the enable switching circuit; a third pin of the second optocoupler connects to one end of the seventeenth resistor, a cathode of the fifth diode and a base electrode of the third diode through the sixteenth resistor; a fourth pin of the second optocoupler connects to a collecting electrode of the third triode and the first conversion module; another end of the seventeenth resistor gets grounded; an anode of the fifth resistor gets grounded; an emitting electrode of the third triode connects to a collecting electrode of the fourth triode, connects to one end of the nineteenth resistor and a cathode of the sixth diode through the eighteenth resistor, and gets grounded through the sixth resistor; another end of the nineteenth resistor gets grounded; an anode of the sixth diode gets grounded; a base electrode of the fourth triode connects to a cathode of the sixth diode, an emitting electrode of the fourth triode connects to the PFC circuit and the second control sub-circuit, and gets grounded through the seventh capacitor.

9. The OLED drive power device according to claim 5, wherein the second control sub-circuit comprises a twentieth resistor, a twenty-first resistor, a twenty-second resistor, a twenty-third resistor, a twenty-fourth resistor, a twenty-fifth resistor, a twenty-sixth resistor, a twenty-seventh resistor, a twenty-eighth resistor, a fifth triode, a seventh diode, an eighth diode, a ninth diode, an eighth capacitor, a ninth capacitor, a tenth capacitor, and a second shunt reference source;

an emitting electrode of the fifth triode connects to the first control sub-circuit, one end of the twenty-first resistor and a cathode of the second shunt reference source through the twentieth resistor, a base electrode of the fifth triode connects to another end of the twenty-first resistor, the emitting electrode of the fifth triode connects to an anode of the seventh diode, and connects to an anode of the eighth diode through the twenty-second resistor; a cathode of the seventh diode connects to the enable switching circuit; a cathode of the eighth diode connects to a cathode of the ninth diode, a feedback pin of the second shunt reference source, and gets grounded through the eighth capacitor; an anode of the second shunt reference source gets grounded; an anode of the ninth diode connects to one end of the twenty-fourth resistor, one end of the ninth capacitor, one end of the tenth capacitor and one end of the twenty-eighth resistor through the twenty-third resistor; another end of the twenty-fourth resistor gets grounded; another end of the ninth capacitor gets grounded; another end of the tenth capacitor gets ground; another end of the twenty-eighth resistor connects to the PFC circuit after connecting in series to the twenty-seventh resistor, the twenty-sixth resistor and the twenty-fifth resistor in a sequence.

10. An OLED television, wherein, comprises an OLED drive power device, the OLED drive power device comprises a power board connecting to a motherboard and an OLED screen logic board, wherein the power board has arranged thereon a power supply circuit, a first conversion module, a second conversion module, a changeover switch and a PFC circuit;

after powered on, the power supply circuit starts the PFC circuit according to an on-off signal output from the motherboard, the PFC circuit outputs a high-voltage direct current to the first conversion module and the second conversion module, and the first conversion module converts the high-voltage direct current into a first voltage and a second voltage to supply power to the motherboard, and the changeover switch converts the first voltage into a first enable voltage to supply power to the OLED screen logic board according to a first enable signal output from the motherboard; after a preset period of time, the motherboard outputs a second enable signal, and the power supply circuit controls the second conversion module start according to the second enable signal, and coverts the high-voltage direct current into a second enable voltage to supply power to the OLED screen logic board, and lighting up the OLED screen.

11. The OLED television according to claim 10, wherein, the power supply circuit comprises an on-off control circuit and an enable switching circuit, the on-off control circuit outputs a third voltage to start the PFC circuit according to the on-off signal output from the motherboard, and outputs a fourth voltage to supply power to the first conversion module, as well as outputs a fifth voltage according to the high-voltage direct current output from the PFC circuit; the enable switching circuit outputs the fifth voltage to supply power to the second conversion module according to the second enable signal output from the motherboard.

12. The OLED television according to claim 11, wherein, the first conversion module comprises a first LLC controller and a first transformer, the first LLC controller starts the first transformer according to the fourth voltage output from the on-off control circuit; the first transformer converts the high-voltage direct current output from the PFC circuit into the first voltage and the second voltage, outputs to supply power to the motherboard.

13. The OLED television according to claim 11, wherein, the second conversion module comprises a second LLC controller and a second transformer, the second LLC controller starts the second transformer according to the fifth voltage output from the enable switching circuit; the second transformer converts the high-voltage direct current output from the PFC circuit into the second enable voltage to power the OLED screen logic board.

14. The OLED television according to claim 11, wherein the on-off control circuit comprises a first control sub-circuit and a second control sub-circuit, the first control sub-circuit outputs the third voltage to start the PFC circuit according to the on-off signal output from the motherboard, and outputs the fourth voltage to power the first conversion module; the second control sub-circuit outputs the fifth voltage according to the high-voltage direct current output from the PFC circuit after starting up.

15. The OLED television according to claim 12, wherein the first conversion module further comprises a standby voltage lowering circuit, applied to control a size of the first voltage and the second voltage output to the motherboard according to the on-off signal.

16. The OLED television according to claim 15, wherein the standby voltage lowering circuit comprises a first diode, a second diode, a third diode, a first resistor, a second resistor, a third resistor, a fourth resistor, a fifth resistor, a sixth resistor, a seventh resistor, an eighth resistor, a ninth resistor, a tenth resistor, an eleventh resistor, a first capacitor, a second capacitor, a third capacitor, a fourth capacitor, a first triode, a first optocoupler and a first shunt reference source;
   an anode of the first diode connects to the motherboard, a cathode of the first diode connects to one end of the second resistor, one end of the first capacitor and a base electrode of the first triode through the first capacitor; another end of the second resistor gets grounded; another end of the first capacitor gets grounded; an emitting electrode of the first triode gets grounded, a collecting electrode of the first triode connects to one end of the seventh resistor, one end of the eighth resistor and one end of the third capacitor, through the third resistor; an anode of the second capacitor connects to one end of the fourth resistor, an anode of the second diode and a cathode of the third diode, a cathode of the second capacitor gets grounded; another end of the fourth resistor connects to a cathode of the second diode; an anode of the second diode connects to one end of the fourth capacitor and a cathode of the first shunt reference source; one end of the fifth resistor connects to a feedback pin of the first shunt reference source, another end of the fourth capacitor and one end of the third capacitor, another end of the fifth resistor gets grounded; one end of the sixth resistor connects to the feedback pin of the first shunt reference source, one end of the sixth resistor gets grounded; another end of the seventh resistor connects to the motherboard; another end of the eighth resistor connects to the OLED screen logic board, and a first pin of the first optocoupler through the eleventh resistor; one end of the ninth resistor connects to another end of the third capacitor, another end of the ninth resistor connects to another end of the tenth resistor, the cathode of the first shunt reference source and a second pin of the first optocoupler; a third pin of the first optocoupler gets grounded, a fourth pin of the first optocoupler connects to the motherboard; an anode of the first shunt reference source gets grounded.

17. The OLED television according to claim 14, wherein the first control sub-circuit comprises a fourth diode, a fifth diode, a sixth diode, a twelfth resistor, a thirteenth resistor, a fourteenth resistor, a fifteenth resistor, a sixteenth resistor, a seventeenth resistor, an eighteenth resistor, a nineteenth resistor, a fifth capacitor, a sixth capacitor, a seventh capacitor, a second triode, a third triode, a fourth triode and a second optocoupler;
   an anode of the fourth diode connects to the motherboard, a cathode of the fourth diode connects to one end of the thirteenth resistor, one end of the fifth capacitor and a base electrode of the second triode through the twelfth resistor; another end of the thirteenth resistor gets grounded; another end of the fifth capacitor gets grounded; an emitting electrode of the second triode gets grounded, a collecting electrode of the second triode connects to a second pin of the second optocoupler, a first pin of the second optocoupler and one end of the fifteenth resistor through the fourteenth resistor, another end of the fifteenth resistor connects to the enable switching circuit; a third pin of the second optocoupler connects to one end of the seventeenth resistor, a cathode of the fifth diode and a base electrode of the third diode through the sixteenth resistor; a fourth pin of the second optocoupler connects to a collecting electrode of the third triode and the first conversion module; another end of the seventeenth resistor gets grounded; an anode of the fifth resistor gets grounded; an emitting electrode of the third triode connects to a collecting electrode of the fourth triode, connects to one end of the nineteenth resistor and a cathode of the sixth diode through the eighteenth resistor, and gets grounded through the sixth resistor; another end of the nineteenth resistor gets grounded; an anode of the sixth diode gets grounded; a base electrode of the fourth triode connects to a cathode of the sixth diode, an emitting electrode of the fourth triode connects to the PFC circuit and the second control sub-circuit, and gets grounded through the seventh capacitor.

18. The OLED television according to claim 14, wherein the second control sub-circuit comprises a twentieth resistor, a twenty-first resistor, a twenty-second resistor, a twenty-third resistor, a twenty-fourth resistor, a twenty-fifth resistor, a twenty-sixth resistor, a twenty-seventh resistor, a twenty-eighth resistor, a fifth triode, a seventh diode, an eighth diode, a ninth diode, an eighth capacitor, a ninth capacitor, a tenth capacitor, and a second shunt reference source;

an emitting electrode of the fifth triode connects to the first control sub-circuit, one end of the twenty-first resistor and a cathode of the second shunt reference source through the twentieth resistor, a base electrode of the fifth triode connects to another end of the twenty-first resistor, an emitting electrode of the fifth triode connects to an anode of the seventh diode, and connects to an anode of the eighth diode through the twenty-second resistor; a cathode of the seventh diode connects to the enable switching circuit; a cathode of the eighth diode connects to a cathode of the ninth diode, a feedback pin of the second shunt reference source, and gets grounded through the eighth capacitor; an anode of the second shunt reference source gets grounded; an anode of the ninth diode connects to one end of the twenty-fourth resistor, one end of the ninth capacitor, one end of the tenth capacitor and one end of the twenty-eighth resistor through the twenty-third resistor; another end of the twenty-fourth resistor gets grounded; another end of the ninth capacitor gets grounded; another end of the tenth capacitor gets ground; another end of the twenty-eighth resistor connects to the PFC circuit after connecting in series to the twenty-seventh resistor, the twenty-sixth resistor, the twenty-fifth resistor in sequence.

* * * * *